Oct. 6, 1959 — J. HOCHBERG — 2,907,677
ARTICLE OF MANUFACTURE AND PROCESS OF MAKING SAME
Filed Sept. 10, 1956
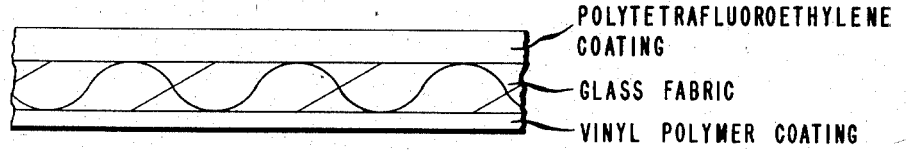
Fig. 1 — POLYTETRAFLUOROETHYLENE COATING / GLASS FABRIC / VINYL POLYMER COATING
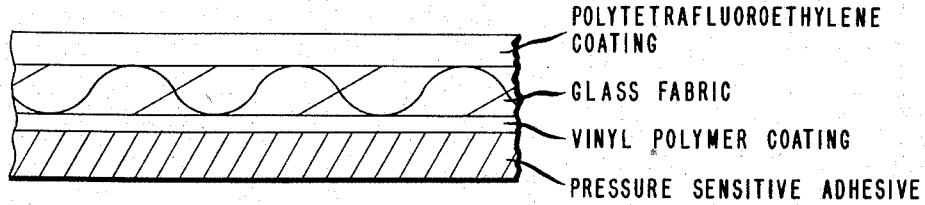
Fig. 2 — POLYTETRAFLUOROETHYLENE COATING / GLASS FABRIC / VINYL POLYMER COATING / PRESSURE SENSITIVE ADHESIVE
INVENTOR
JEROME HOCHBERG
BY
AGENT

United States Patent Office 2,907,677
Patented Oct. 6, 1959

2,907,677

ARTICLE OF MANUFACTURE AND PROCESS OF MAKING SAME

Jerome Hochberg, Newburgh, N.Y., assignor to E. I. du Pont de Nemours and Company, Wilmington, Del., a corporation of Delaware Application September 10, 1956, Serial No. 608,891

2 Claims. (Cl. 117—68.5)

This invention relates to polytetrafluoroethylene-coated fabrics and more particularly to glass fabrics coated on one side only with polytetrafluoroethylene which are resistant to curling and more particularly to such non-curling polytetrafluoroethylene coated glass fabrics with a pressure sensitive adhesive coating on the side of the glass fabric opposite the polytetrafluoroethylene coating.

When glass fabric is coated on one side with polytetrafluoroethylene followed by the customary calendering and fusing operations, the resulting product has a decided tendency to curl. This curling makes it difficult and in many cases impossible to handle the coated fabric in equipment ordinarily used for applying adhesive to the uncoated side of the glass fabric. Usually a considerable amount of time has elapsed between production of the coated fabric and application of the adhesive. The latter operation often is performed in an entirely different locale. During the interim, the tendency of the product to curl increases, thereby increasing the problems related to handling and processing in subsequent operations.

The primary object of this invention is to provide a relatively non-curling glass fabric coated on one side only with polytetrafluoroethylene. A further object is to provide a glass fabric having a polytetrafluoroethylene coating on one side only which lends itself to the successful application of pressure-sensitive adhesive on the opposite side.

The objects of this invention are accomplished by applying to the uncoated side of one-side-coated polytetrafluoroethylene-coated glass fabric a light coating of a composition comprising predominantly a vinyl chloride polymer.

In the appended drawing Figure 1 is a sectional illustration of the curl resistant polytetrafluoroethylene one-side-coated glass fabric and Figure 2 is a sectional illustration of the product illustrated in Figure 1 plus a pressure sensitive adhesive applied on the side of the glass fabric opposite the polytetrafluoroethylene coating.

By way of illustration and not limitation, the following examples are given. Unless stated otherwise the parts and percentage figures are expressed on a weight basis.

Example I

A glass fabric identified as ECC–128, obtainable from Owens-Corning Fiberglas Corporation, New York, N.Y., and having the following specifications:

| | |
|---|---|
| Width, inches | 38 |
| Thickness, mils | 7 |
| Avg. ounces per sq. yd. | 6 |
| Weave | Plain |
| Warp and fill yarn | 225⅓ |
| Thread count per inch: | |
| Warp | 42 |
| Fill | 32 | was given five doctor knife applications of the following coating composition on one side of the fabric:

| | Pts. by wt. | |
|---|---|---|
| Polytetrafluoroethylene aqueous dispersion: | | |
| Polytetrafluoroethylene | 60.0 | |
| Octyl phenyl polyglycol ether | 3.6 | 73.8 |
| Water | 36.4 | |
| Talc dispersion: | | |
| Talc | 60.0 | |
| Octyl phenyl polyglycol ether | 1.0 | 18.3 |
| Water | 39.0 | |
| Poly n-butyl methacrylate aqueous latex: | | |
| Poly n-butyl methacrylate | 33.0 | |
| Triethanol amine | 0.9 | 6.9 |
| Sulfonated oleyl acetate | 4.8 | |
| Water | 61.3 | |
| Ammonium alginate | | 1.0 |
| | | 100.0 |

The above composition was creamy and had the consistency of mayonnaise and did not strike through the interstices of the glass fabric when applied thereto by means of the doctor knife.

After each successive application the treated fabric was passed through a heat zone to evaporate the volatile portion of the coating composition. The dry coated fabric was then calendered to close any voids or cracks in the coating that might be present in accordance with the teaching of U.S. Patent 2,539,329. The calendered coated fabric was heated to at least 621° F. to fuse or sinter the polytetrafluoroethylene coating.

The glass fabric coated on one side only had the following physical properties:

| | |
|---|---|
| Total weight, oz./sq. yd. | 10.0 |
| Weight of coating, oz./sq. yd. | 4.0 |
| Weight of fabric, oz./sq. yd. | 6.0 |
| Thickness, mils | 9.1 |
| Grab tensile strength: | |
| Warp, lbs. | 250.0 |
| Fill, lbs. | 238.0 |
| Elmendorf tear strength (std. instrument with NBS augmenting weight): | |
| Warp, g. | >3200 |
| Fill, g. | >3200 |

The product at this stage is claimed in my copending application Serial No. 476,835, filed December 21, 1954.

The uncoated side of this product was then given a light roller-coat application of the following resin solution:

| | Percent by wt. |
|---|---|
| "Vinylite" VMCH | 4.0 |
| Polymethyl methacrylate | 1.0 |
| Methyl ethyl ketone | 95.0 |
| | 100.0 |

The "Vinylite" VMCH resin in the above formula was a copolymer available from Carbide and Carbon Chemicals Corp., containing 80–90 parts vinyl chloride, 19.7–7.0 parts vinyl acetate and .3–3.0 parts maleic acid. It may be produced in accordance with the teaching set forth in U.S. Patent 2,329,456, issued September 14, 1953, to William E. Campbell, Jr.

Forced drying was used to remove the volatile portion of the coating. Then the dried coating received a smooth calendering operation to further enhance its curl resisting property. At this point a great improvement was apparent in the ability of the coated fabric to resist curling as compared with untreated one-side-coated polytetrafluoroethylene-coated fabric. The amount of dry curl resistant coating applied was approximately .2 to .5 dry ounce per square yard.

When fed into an adhesive-coating machine the treated fabric remained flat and received an ideal layer of pressure sensitive adhesive. On the other hand, a similar polytetrafluoroethylene coated glass fabric without the curl resistant coating became folded and twisted, resulting in a product totally unsuited for cutting into tape or for any other use.

The pressure-sensitive adhesive which was applied to the vinyl polymer-treated side was formulated as follows:

| | Percent by wt. |
|---|---|
| Polyisobutylene ("Vistanex" LM Type H) | 50.0 |
| Toluene | 50.0 |
| | 100.0 |

A tacky pressure-sensitive adhesive surface remained after evaporation of the toluene. The adhesive-coated fabric was then slit into tape 3 inches wide. With the polytetrafluoroethylene coated surface on the outside, a textile processing roll was spirally wrapped with this tape, giving the roll valuable antisticking properties.

In the following two examples a one-side-coated polytetrafluoroethylene-coated glass fabric was prepared exactly as described in Example I. A light roller-applied coating was then deposited on the uncoated side using the coating solution shown in each example.

*Example II*

| | Percent by wt. |
|---|---|
| "Geon" 101, polyvinyl chloride | 5 |
| Methyl ethyl ketone | 95 |
| | 100 |

The "Geon" 101 is a vinyl chloride homopolymer available from the B. F. Goodrich Chemical Co. After the treated fabric was dried and smooth calendered as in Example I it had a comparable improvement in curl resistance and it could be used in a like manner.

*Example III*

| | Percent by wt. |
|---|---|
| "Vinylite" VAGH, copolymer of vinyl chloride and vinyl acetate containing hydroxyl groups | 6 |
| Toluene | 47 |
| Methyl ethyl ketone | 47 |
| | 100 |

The "Vinylite" VAGH is a vinyl chloride-acetate copolymer resin available from Carbide and Carbon Chemicals Corp., containing 91% vinyl chloride and 3% vinyl acetate, plus a hydroxyl content of 2.3%.

When the product of this example was dried and smooth calendered as in Example I it had a similar improvement in curl resistance and could readily be made into antisticking adhesive tape in a like manner.

In place of the vinyl chloride polymers in the examples substantially similar results will be obtained when they are substituted in equal amount by other vinyl chloride polymers.

The vinyl chloride polymers that may be used include polyvinyl chloride and copolymers of vinyl chloride obtained by polymerizing vinyl chloride in the presence of other monomers copolymerizable therewith such as diesters of fumaric or maleic acid including dimethyl, diethyl, dipropyl, and dibutyl fumarate and maleate, copolymers of vinyl chloride and esters of acrylic and alpha-chloroacrylic or propyl esters, copolymers of vinyl chloride with vinylidene chloride and also copolymers of vinyl chloride and vinyl esters of organic acids such as vinyl acetate. When copolymers are used polyvinyl chloride is present in major amount—usually at least 80%.

The glass fabric coated on one side with polytetrafluoroethylene and on the opposite side with a vinyl chloride polymer containing composition may be adhered to the surface of numerous other materials, such as metals, wood, glass, and fabrics. Any adhesive which will adhere to the vinyl polymer treated fabric surface and to the other surfaces may be used. A protective surface for a laboratory table top is produced by adhering the vinyl polymer treated side of the fabric to the table top by means of a cement, such as that described in Example I. The resulting polytetrafluoroethylene surfaced table top is chemical and solvent resistant, nonabsorbent, heat resistant, and repellent to sticky substances.

Other pressure-sensitive adhesives which may be applied to the vinyl polymer coated side of the non-curling polytetrafluoroethylene coated fabric may be based on neoprene, butadiene polymers and copolymers, natural rubber, and other rubbery or tacky polymers. Suitable compositions for the pressure sensitive adhesive mass are disclosed in U.S. Patent 2,137,969. Other examples of such compositions and their mode of application are also disclosed in "The Chemical Formulary," by Bennett, volume 2, page 366, D. Van Nostrand Co., New York (1935), and "The Pharmacopoeia of the United States of America," eleventh decennial revision, Mack Printing Co., Easton, Pa. (1936). Fabric tape thus coated with adhesive is useful as a cable wrap for electrical insulation.

Wall areas and surfaces of machinery which are exposed to attack by strong acids or alkalies are easily and effectively protected with pressure-sensitive tape or sheets made from this vinyl polymer treated polytetrafluoroethylene coated fabric.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The invention claimed is:

1. A glass fabric having a coating on one side consisting essentially of polytetrafluoroethylene and on the opposite side a coating consisting essentially of a polymer containing at least 80% by weight of vinyl chloride, superposed over said second mentioned coating a pressure sensitive adhesive.

2. The product of claim 1 in which the pressure sensitive adhesive consists essentially of polyisobutylene.

References Cited in the file of this patent

UNITED STATES PATENTS

| | | |
|---|---|---|
| 2,033,170 | Alt et al. | Mar. 10, 1936 |
| 2,137,969 | Thomas | Nov. 22, 1938 |
| 2,306,781 | Francis | Dec. 29, 1942 |
| 2,329,456 | Campbell | Sept. 14, 1943 |
| 2,358,831 | Schieman | Sept. 26, 1944 |
| 2,369,876 | Warren | Feb. 20, 1945 |
| 2,445,553 | Beavers | July 20, 1948 |
| 2,495,661 | Scanlan | Jan. 24, 1950 |
| 2,539,329 | Sanders | Jan. 23, 1951 |
| 2,702,580 | Bateman | Feb. 22, 1955 |
| 2,710,266 | Hochberg | June 7, 1955 |
| 2,744,835 | Caroselli | May 8, 1956 |
| 2,765,241 | Wayne | Oct. 2, 1956 |